US012030026B2

(12) United States Patent
Sogabe et al.

(10) Patent No.: US 12,030,026 B2
(45) Date of Patent: Jul. 9, 2024

(54) STIRRING DEVICE

(71) Applicant: Sumitomo Heavy Industries Process Equipment Co., Ltd., Ehime (JP)

(72) Inventors: Hiroshi Sogabe, Saijo (JP); Yoriyuki Kanemori, Saijo (JP)

(73) Assignee: SUMITOMO HEAVY INDUSTRIES PROCESS EQUIPMENT CO., LTD., Ehime (JP)

( * ) Notice: Subject to any disclaimer, the term of this patent is extended or adjusted under 35 U.S.C. 154(b) by 293 days.

(21) Appl. No.: 17/199,467

(22) Filed: Mar. 12, 2021

(65) Prior Publication Data

US 2021/0283561 A1 Sep. 16, 2021

(30) Foreign Application Priority Data

Mar. 12, 2020 (JP) ................................ 2020-042862

(51) Int. Cl.
*B01F 35/31* (2022.01)
*B01F 27/91* (2022.01)
*B01F 35/30* (2022.01)

(52) U.S. Cl.
CPC .............. *B01F 35/31* (2022.01); *B01F 27/91* (2022.01); *B01F 2035/351* (2022.01)

(58) Field of Classification Search
CPC .......... B01F 27/91; B01F 35/31; B01F 35/32; B01F 23/14; B01F 2035/351; B01F 2035/3512; B01F 2035/3513; F16J 15/34
USPC .......................................................... 366/331
See application file for complete search history.

(56) References Cited

U.S. PATENT DOCUMENTS 3,774,889 A * 11/1973 Guary ..................... B01F 27/93 366/314
3,887,169 A * 6/1975 Maynard ................. B01F 27/71 416/213 A
4,066,246 A * 1/1978 Korstvedt ................ F16J 15/34 366/293

(Continued)

FOREIGN PATENT DOCUMENTS

CA 2636866 A1 * 7/2007 .......... B01F 3/04531
CN 204739221 U * 11/2015

(Continued)

OTHER PUBLICATIONS

Machine translation of the Office Action for JP2020-042862 dated Oct. 31, 2023 as the explanation of JP H02-066230 U, pp. 1-5.

*Primary Examiner* — Walter D. Griffin
*Assistant Examiner* — Patrick M McCarty
(74) *Attorney, Agent, or Firm* — HEA LAW PLLC

(57) ABSTRACT

The sealing performance of a stirring device and the abrasion resistance of a seal are improved. A stirring device includes a stirring tank that defines a stirring chamber; a plurality of stirring blades that are disposed in the stirring chamber; a shear blade drive shaft that extends from a lower side of the stirring tank to the stirring chamber and rotationally drives at least one shear blade among the plurality of stirring blades; and a fixed ring and a rotating ring that is disposed radially outside the shear blade drive shaft and seals between the stirring tank and the shear blade drive shaft. A sealing surface of the mechanical seal structure is formed at the same height as or above a lowermost portion of the stirring chamber.

11 Claims, 7 Drawing Sheets

(56) References Cited

U.S. PATENT DOCUMENTS

| | | | | |
|---|---|---|---|---|
| 4,193,522 | A * | 3/1980 | Edelbach | B01F 27/50 222/242 |
| 5,624,186 | A * | 4/1997 | Ogier | B01F 27/272 366/182.2 |
| 6,193,409 | B1 * | 2/2001 | Brunson | B01F 35/10 366/331 |
| 6,325,378 | B1 * | 12/2001 | Okumachi | F16J 15/342 277/408 |
| 10,478,791 | B2 | 11/2019 | Morinaga et al. | |
| 10,669,515 | B2 | 6/2020 | Jones et al. | |
| 2009/0114616 | A1 * | 5/2009 | White | A47J 43/046 215/307 |
| 2010/0148448 | A1 * | 6/2010 | Pinto | F16J 15/3464 277/371 |
| 2013/0264404 | A1 * | 10/2013 | Rosenzweig | A47J 43/085 366/293 |
| 2015/0115538 | A1 * | 4/2015 | D'Orazio | F16J 15/3464 277/358 |
| 2015/0165399 | A1 * | 6/2015 | Rawlings | B01F 27/808 366/265 |
| 2015/0226333 | A1 * | 8/2015 | Yanagisawa | F16J 15/3496 277/358 |
| 2016/0331181 | A1 * | 11/2016 | Dickson, Jr. | A47J 43/0722 |

FOREIGN PATENT DOCUMENTS

| | | | | |
|---|---|---|---|---|
| DE | 3534452 | A1 | * | 4/1987 |
| JP | S49-085657 | A | | 8/1974 |
| JP | S51-117261 | A | | 10/1976 |
| JP | S51117261 | A | * | 10/1976 |
| JP | S52-044955 | U | | 3/1977 |
| JP | S54-122249 | U | | 8/1979 |
| JP | S5869009 | A | * | 4/1983 |
| JP | S60-168536 | U | | 11/1985 |
| JP | H02-066230 | U | | 5/1990 |
| JP | H08254402 | A | * | 10/1996 |
| JP | 2000186774 | A | * | 7/2000 |
| JP | 2012-115808 | A | | 6/2012 |
| JP | 2014226241 | A | | 12/2014 |
| JP | 2018086626 | A | | 6/2018 |
| JP | 2019501768 | A | | 1/2019 |
| KR | 101979847 | B1 | * | 5/2019 |
| WO | 2017002905 | A1 | | 1/2017 |

* cited by examiner

STIRRING DEVICE

RELATED APPLICATIONS

The content of Japanese Patent Application No. 2020-042862, on the basis of each of which priority benefits are claimed in an accompanying application data sheet, are in their entirety incorporated herein by reference.

BACKGROUND

Technical Field

Certain embodiments relate to a stirring device.

Description of Related Art

In the related art, stirring devices that stir a stirring object having fluidity have been known. A stirring blade that is rotationally driven is disposed in a stirring device.

SUMMARY

According to an embodiment of the present invention, there is provided a stirring tank that defines a stirring chamber; a plurality of stirring blades that are disposed in the stirring chamber; a drive shaft that extends from a lower side of the stirring tank to an inside of the stirring chamber and rotationally drives at least one stirring blade among the plurality of stirring blades; and a mechanical seal structure that is disposed radially outside the drive shaft and seals between the stirring tank and the drive shaft. A sealing surface of the mechanical seal structure is formed at the same height as or above a lowermost portion of the stirring chamber.

DETAILED DESCRIPTION

A drive shaft that rotates the stirring blade is penetrated into the stirring device. In a case where the drive shaft is penetrated from a lower portion of the stirring device, it is necessary to ensure the sealing performance between a main body and the drive shaft of the stirring device.

Since a shear blade that applies a shearing force to the stirring object rotates at a relatively high speed, there is a possibility that the amount of abrasion of the seal may increase and the life of the seal may be shortened.

It is desirable to extend the life of a seal.

Hereinafter, a stirring device according to an embodiment of the present invention will be described in detail. The stirring device of the present embodiment is used, for example, for emulsification. As a stirring object in a case where the emulsification is performed, for example, various materials for cosmetics and foods can be used, but the stirring object is not limited to these. The stirring object may be any as long as it has fluidity, and includes a fluid (liquid, gas), a particulate or powdery solid, and a mixture thereof.

In addition, an upward direction and a downward direction, which are used below, mean an upward direction and a downward direction when the stirring device is set to a state in which the stirring device is to be used. The radial direction means a radial direction of a rotary shaft of a stirring blade of the stirring device, and the circumferential direction means a circumferential direction (a rotational direction of the rotary shaft or a direction opposite to the rotational direction) of the rotary shaft.

Figure 1:
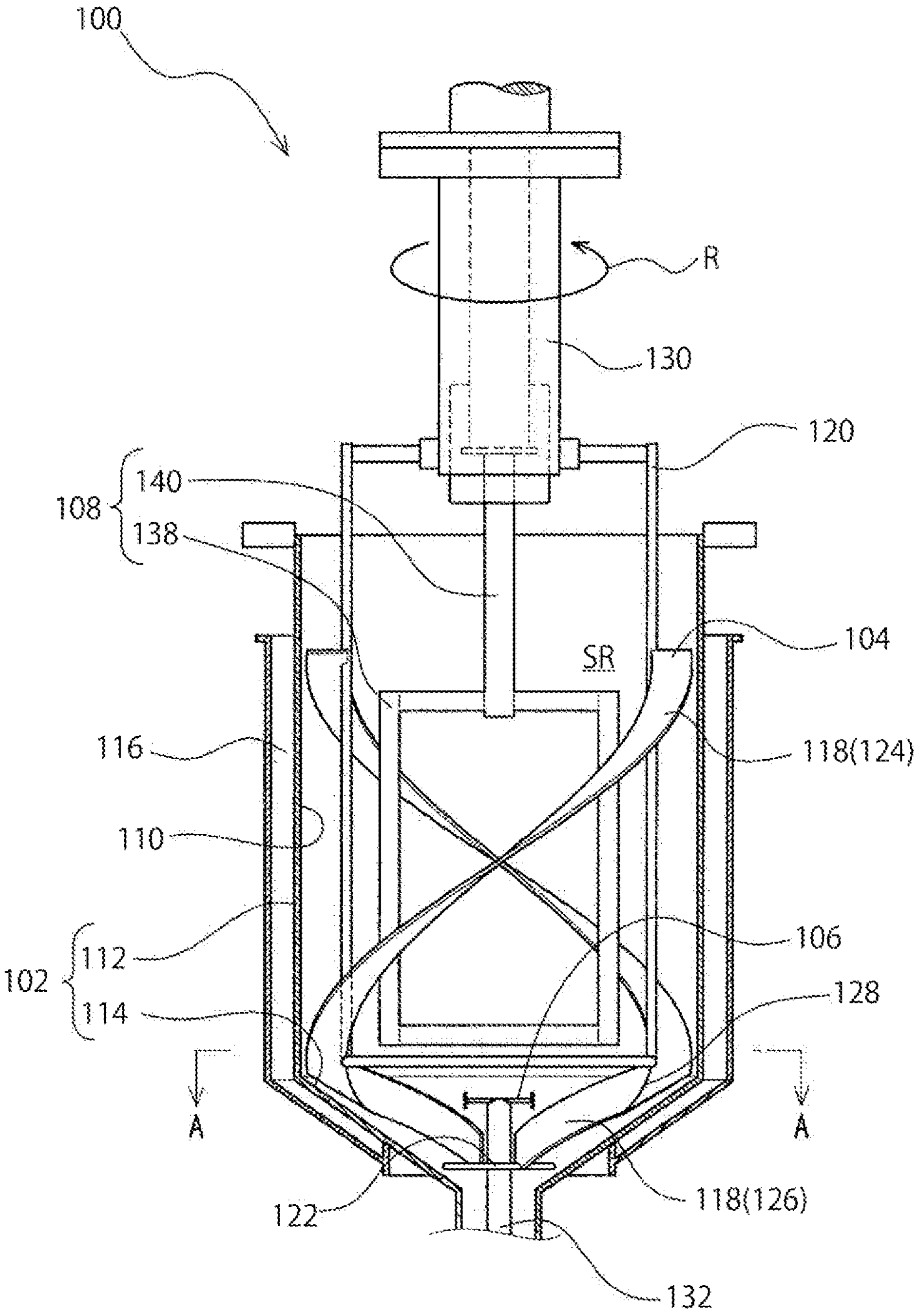
FIG. 1 is a vertical cross-sectional view of the stirring device according to one embodiment.
Figure 2:
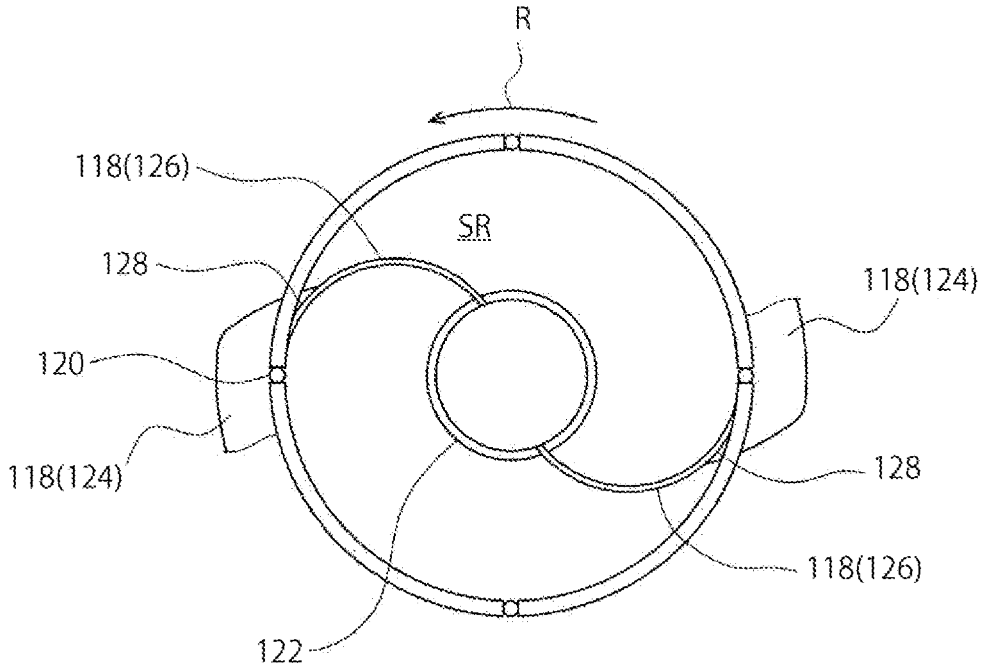
FIG. 2 is a cross-sectional view of cross-section AA of FIG. 1.

FIG. 1 is a vertical cross-sectional view of the stirring device according to one embodiment. FIG. 2 is a cross-sectional view of cross-section AA of FIG. 1. The stirring device 100 includes a stirring tank 102 that accommodated the stirring object and defines a stirring chamber SR. A plurality of stirring blades are disposed in the stirring chamber SR. More specifically, a circulating impeller 104, a shear blade 106, and a gate blade 108 are disposed in the stirring chamber SR. The circulating impeller 104, the shear blade 106, and the gate blade 108 rotate around with the same axis and independently of each other. The rotation speeds of the circulating impeller 104, the shear blade 106, and the gate blade 108 are controlled according to the properties of the stirring object.

The stirring tank 102 is a container having a cylindrical inner peripheral wall 110. The stirring tank 102 includes a cylindrical upper body portion 112 and a truncated cone-shaped lower body portion 114. The upper body portion 112 and the lower body portion 114 are integrally formed. The inner diameter of the upper body portion 112 is constant in the up-down direction. The inner diameter of the lower body portion 114 decreases toward the bottom. An upper end of the upper body portion 112 is sealed by a lid (not illustrated), and the stirring tank 102 functions as a pressure vessel. A jacket portion 116 that heats or cools the stirring object in the stirring tank 102 is disposed outside the stirring tank 102.

The circulating impeller 104 is a ribbon blade that generates an axial flow. The circulating impeller 104 is provided along the inner peripheral wall 110 of the stirring tank 102 and rotates around the vertical axis to form an induced flow Fin the stirring object present in the stirring tank 102. This induced flow F becomes a part of the flow that largely flows through the entire stirring tank 102. In a case where the stirring device 100 is used for the emulsification, the stirring object is guided to the shear blade 106 by the induced flow F.

The circulating impeller 104 of the present embodiment includes a circulating impeller body 118 that is disposed along the inner peripheral wall 110 of the stirring tank 102 and has a predetermined width, a plurality of support rods 120 that support the circulating impeller body 118, and a support ring 122 that connects and supports the circulating impeller body 118 on a lower side thereof. A plurality of circulating impeller bodies 118 may be provided. Each circulating impeller body 118 has a curved band shape. The circulating impeller body 118 includes an upper blade 124 and a lower blade 126. The upper blade 124 is disposed in the upper body portion 112 and has a diameter slightly smaller than the inner circumference of the upper body portion 112. The lower blade 126 is disposed in the lower body portion 114 and the diameter thereof decreases downward.

The upper blade 124 extends downward from above while being inclined at a certain angle in the circumferential direction. When the upper blade 124 rotates in the upper body portion 112, the upper blade 124 scrapes the stirring object and forms the induced flow F that is directed downward while turning. The lower blade 126 is located substantially along the surface shape of the inner peripheral wall of the lower body portion 114 in the stirring tank 102. The lower blade 126 has a curved shape so as to bulge in a direction opposite to a rotational direction R when viewed in a plan view.

The upper blade 124 and the lower blade 126 are connected to each other at a joining portion 128 such that the surface of each blade is bent (or twisted). Specifically, as illustrated in FIG. 2, the upper blade 124 and the lower blade 126 are connected to each other by welding or the like at the joining portion 128 in a state in which the surface of a band-shaped body constituting the lower blade 126 abuts against a radially inner edge of a band-shaped body constituting the upper blade 124. The position of the joining portion 128 in the up-down direction corresponds to a boundary between the upper body portion 112 and the lower body portion 114. Accordingly, the upper blade 124 and the lower blade 126 are integrated with each other.

Figure 3:
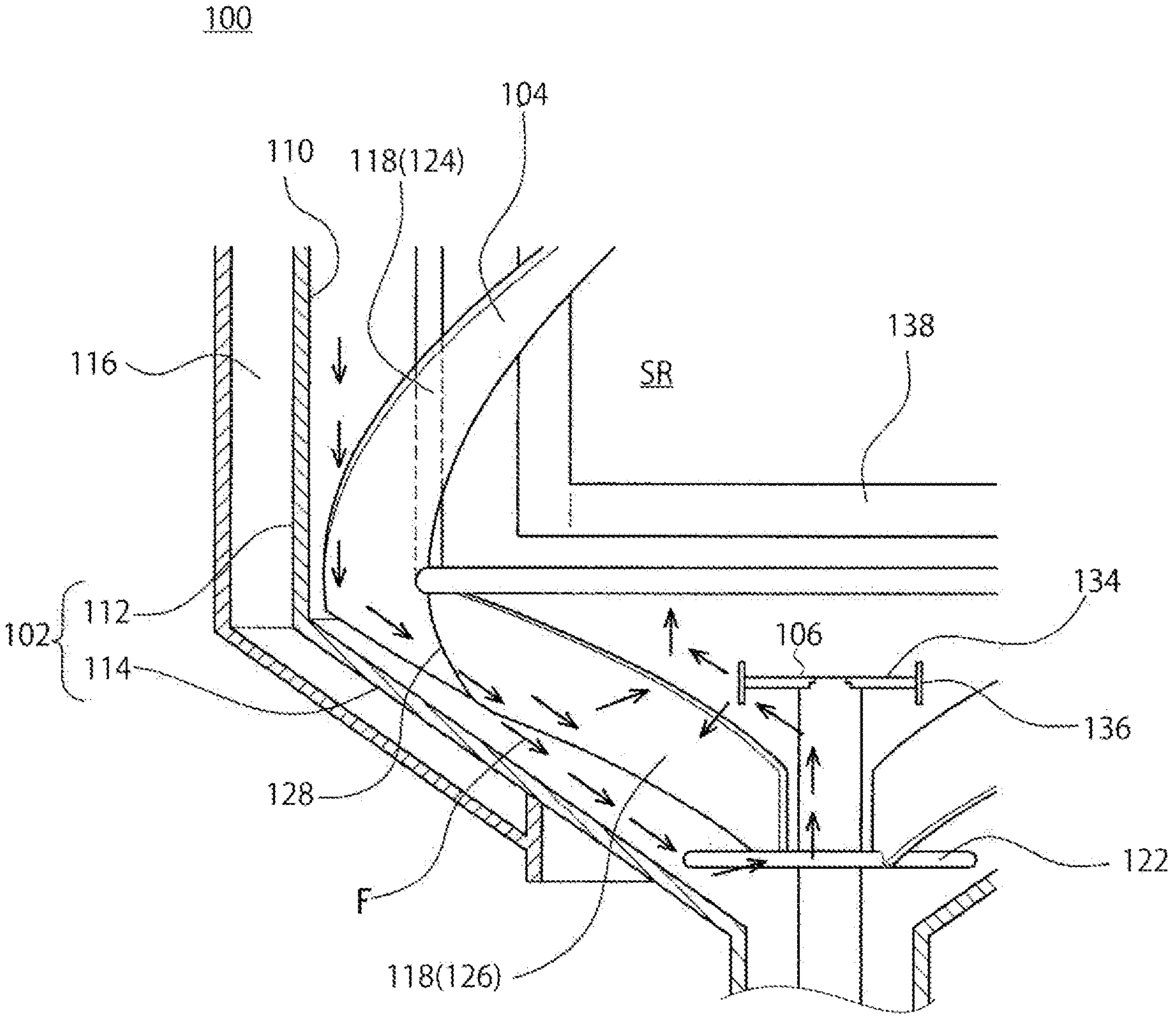
FIG. 3 is an enlarged cross-sectional view of a throttle portion.

FIG. 3 is an enlarged cross-sectional view of the throttle portion. When the lower blade 126 rotates in the rotational direction R in the lower body portion 114, the induced flow F formed by the upper blade 124 flow radially inward. Accordingly, the induced flow F is guided to the shear blade 106. A downward facing surface of each circulating impeller body 118 pushes the stirring object downward. In order to form a uniform induced flow F, it is preferable that the downward facing surface of each circulating impeller body 118 is a curved surface having no step.

The circulating impeller body 118 of the circulating impeller 104 is welded to and integrated with the support rods 120 at predetermined intervals in the circumferential direction. An upper end of each support rod 120 is joined to a circulating impeller drive shaft 130. The circulating impeller drive shaft 130 is connected to a circulating impeller drive unit (not illustrated). When the circulating impeller drive unit is driven, the circulating impeller drive shaft 130 rotates, and thereby, the support rods 120 turns around the circulating impeller drive shaft 130. By turning the support rods 120, the circulating impeller body 118 turns around the vertical axis. The support ring 122 is fixed to a lower end of each circulating impeller body 118. A shear blade drive shaft 132 extending in the up-down direction passes through the support ring 122. The induced flow F for the stirring object ascends along an outer periphery of the shear blade drive shaft 132 from a bottom portion of the lower body portion 114 and is guided to the shear blade 106 through a gap between the shear blade drive shaft 132 and the support ring 122. The rotation speed of the circulating impeller 104 is set to be lower than the rotation speed of the shear blade 106.

The shear blade 106 applies a shearing force to the stirring object by rotation. In a case where the stirring device 100 is used for the emulsification, droplets are divided into subdivisions by the shear blade 106.

As the shear blade 106, for example, a dispersion blade can be used. The dispersion blade includes a plurality of shear teeth 136 that form a radially outward discharge flow of the stirring object. The plurality of shear teeth 136 are disposed, for example, at an outer peripheral edge of a rotatable disk portion 134 so as to extend in a direction intersecting the surface direction of the disk portion 134. The shear teeth 136 are inclined with respect to a tangential direction of the outer peripheral edge of the disk portion 134. The inclined shear teeth 136 form a discharge flow of the stirring object to the outside in the radial direction when the disk portion 134 is rotated.

The shear blade 106 rotates at a higher speed than the circulating impeller 104. When the shear blade 106 is rotated, the shear teeth 136 collide with the stirring object. Accordingly, the shear teeth 136 apply a shearing force to the stirring object.

The shear blade drive shaft 132, which extends downward, is connected to the shear blade 106. A seal structure is formed between the stirring tank 102 and the shear blade drive shaft 132 such that the stirring object does not leak. The seal structure will be described below. The shear blade drive shaft 132 is connected to a shear blade drive unit (not illustrated) provided below the stirring tank 102.

The gate blade 108 may be provided radially inward of the circulating impeller 104. The gate blade 108 includes a lattice-like gate blade body 138. The gate blade body 138 has, for example, a symmetrical shape with respect to a rotation center (vertical axis). The gate blade 108 rotates in a direction opposite to that of the circulating impeller 104. The gate blade 108 may be rotated in the same direction as the circulating impeller 104 and at a rotation speed different therefrom. Agate blade drive unit (not illustrated) for rotating the gate blade 108 is disposed above the stirring tank 102. A gate blade drive shaft 140 that transmits the power of the gate blade drive unit to the gate blade 108 is located above the gate blade body 138 and is provided concentrically with the circulating impeller drive shaft 130.

When the circulating impeller 104 and the gate blade 108 are combined with each other, different flows (flows in different directions or different velocities) can be created in the stirring tank 102. Accordingly, it is possible to suppress that the stirring object moves at the same velocity as the circulating impeller 104 and does not flow.

Figure 4:
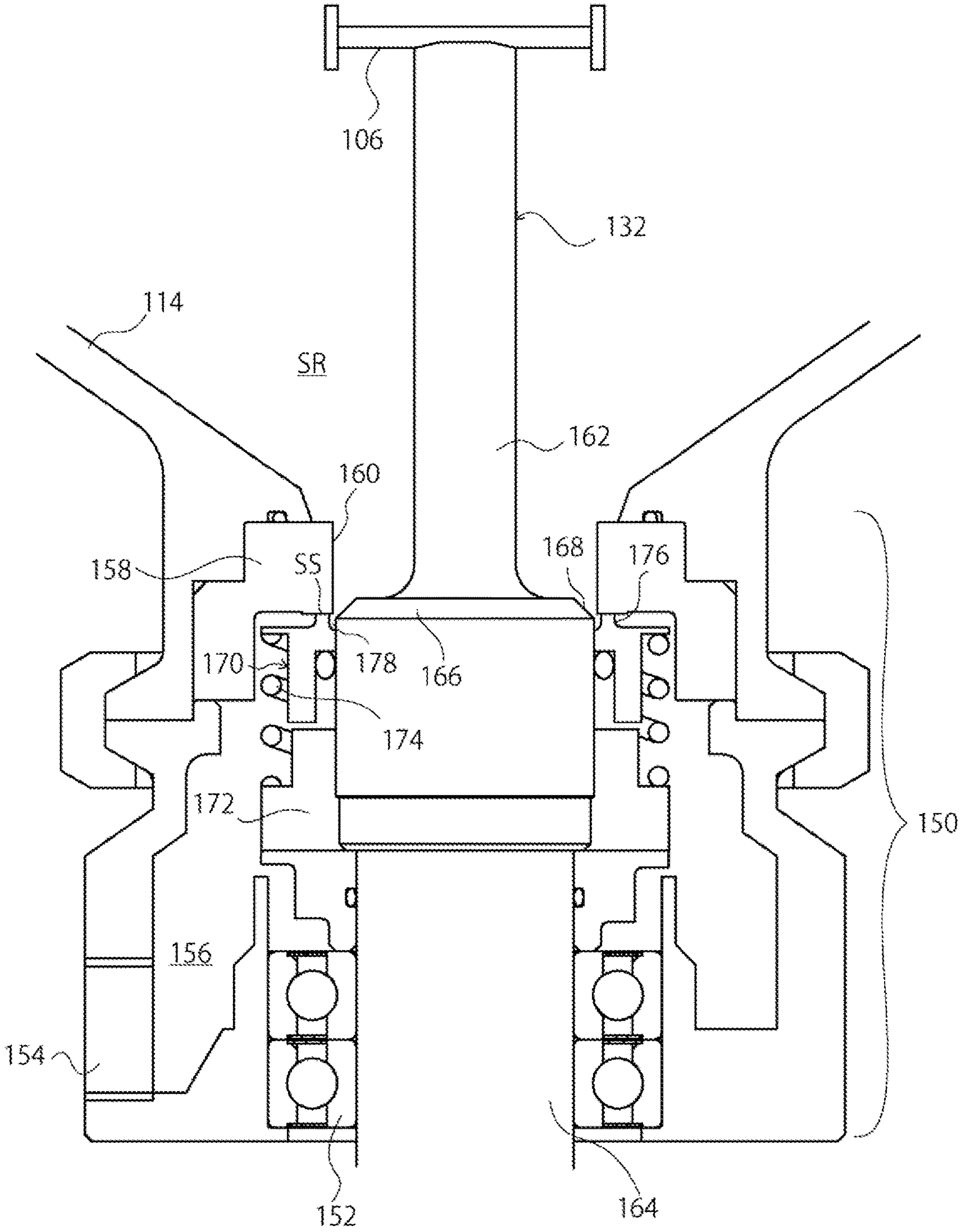
FIG. 4 is an enlarged cross-sectional view of a lower portion of a stirring tank.

FIG. 4 is an enlarged cross-sectional view of a lower portion of the stirring tank. A mechanical seal structure for sealing between the stirring tank 102 and the shear blade drive shaft 132 is provided between the two. In addition, the sealing between the stirring tank 102 and the shear blade drive shaft 132 means the sealing between a rotating member such as the shear blade drive shaft 132 and a stationary member such as the stirring tank 102 during the operation of the stirring device 100. Thus, even if another member is interposed between the shear blade drive shaft 132 and the stirring tank 102 to form a seal structure, the seal structure is considered to be formed between the stirring tank 102 and the shear blade drive shaft 132.

In addition to the above-described configuration, the stirring tank 102 includes a drive shaft support portion 150 that supports the shear blade drive shaft 132 from the outside in the radial direction. The drive shaft support portion 150 is provided at the lowermost portion of the stirring tank 102. The shear blade drive shaft 132 penetrates the drive shaft support portion 150 and extends from the lower side of the stirring tank 102 to the inside of the stirring chamber SR. The drive shaft support portion 150 includes a plurality of ball bearings 152 that rotatably support the shear blade drive shaft 132 from the outside in the radial direction. A drainage path 156 for guiding the liquid discharged from the mechanical seal structure to a drainage portion 154 is formed in the drive shaft support portion 150.

The stirring tank 102 includes a fixed ring 158 provided in the vicinity of the lowermost portion of the stirring chamber SR. The fixed ring 158 is fixed to a lower end of the lower body portion 114 without a gap. An inner peripheral surface 160 of the fixed ring 158 is exposed to the stirring chamber SR and is disposed at a predetermined distance from an outer peripheral surface of the shear blade drive shaft 132. By separating the two from each other to expose the inner peripheral surface 160, a sufficient gap can be formed between the inner peripheral surface 160 of the fixed ring 158 and the shear blade drive shaft 132 to stir the stirring object. That is, the flow path resistance of the gap between the inner peripheral surface 160 of the fixed ring 158 and the shear blade drive shaft 132 is sufficiently small and does not function as a non-contact seal. For example, the inner peripheral surface 160 of the fixed ring 158 and the shear blade drive shaft 132 are preferably separated from each other by at least 5 mm or more. Thus, the inner peripheral surface 160 of the fixed ring 158 and the shear blade drive shaft 132 also form a part of the stirring chamber SR.

The shear blade drive shaft 132 includes a first portion 162 to which the shear blade 106 is fixed, and a second portion 164 that has a larger diameter than the first portion 162 and is provided below the first portion 162. The first portion 162 extends from an upper end of the shear blade drive shaft 132 to the vicinity of a lower end of the fixed ring 158, and the second portion 164 extends below the lower end of the fixed ring 158 of the stirring chamber SR. The shear blade drive shaft 132 may include a transition portion 166 between the first portion 162 and the second portion 164. The diameters of the second portion 164 and the transition portion 166 are smaller than the inner diameter of the fixed ring 158, and a gap is formed between the two when viewed from above. For that reason, the diameter of the upper end of the transition portion 166 is smaller than the diameter of the first portion 162. An upper side of the transition portion 166 is connected to the first portion 162, and a lower side of the transition portion 166 is connected to the second portion 164. The transition portion 166 has the same diameter as the second portion 164 at a boundary between the transition portion 166 and the second portion 164. The diameter of the transition portion 166 gradually decreases toward the top. That is, the transition portion 166 has a truncated cone shape, and an outer periphery thereof forms an inclined surface 168 that faces upward. A lower end of the inclined surface 168 is located slightly radially inside the fixed ring 158. A gap sufficient to stir the stirring object is formed between the inclined surface 168 and the fixed ring 158. A part of the stirring chamber SR is also formed between the inner peripheral surface 160 of the fixed ring 158 and the inclined surface 168.

A rotating ring 170 is attached to the vicinity of an upper end of the second portion 164. The rotating ring 170 is constrained in the circumferential direction and movable in the axial direction with respect to the second portion 164. The rotating ring 170 rotates integrally with the shear blade drive shaft 132. A pedestal 172 fixed to the second portion 164 is provided below the rotating ring 170. The rotating ring 170 is urged upward by a spring 174 disposed between the rotating ring 170 and the pedestal 172. An annular protrusion 176 is formed on an upper portion of the rotating ring 170. The protrusion 176 extends upward from an upper surface of the rotating ring 170, and a top surface of the protrusion 176 faces a bottom surface of the fixed ring 158. When the stirring device 100 is driven, a sealing surface SS is formed between the top surface of the protrusion 176 and the bottom surface of the fixed ring 158. Therefore, in the stirring device 100, the fixed ring 158 and the rotating ring 170 form the mechanical seal structure.

The sealing surface SS is formed by a liquid component of the stirring object entering between the top surface of the protrusion 176 and the bottom surface of the fixed ring 158 when the stirring device 100 is driven. The sealing surface SS extends in the horizontal direction and a radially inner end thereof is adjacent to the lowermost portion of the stirring chamber SR. The sealing surface SS is formed at the same height as the lowermost portion of the stirring chamber SR or above the lowermost portion. In a case where the transition portion 166 is provided between the first portion 162 and the second portion 164, the lowermost portion of the stirring chamber SR in the stirring device 100 means the uppermost portion of the second portion 164. The lowermost portion of the stirring chamber SR may be said to be a lower end of the transition portion 166. Accordingly, the sealing surface SS has the same height as the uppermost portion of the second portion 164 or is formed above the uppermost portion of the second portion 164. Additionally, the sealing surface SS is preferably provided below the lowermost portion of the first portion 162. Therefore, the sealing surface SS is disposed in a range in which the transition portion 166 is provided in the up-down direction. In the illustrated example, the sealing surface SS is located at a position slightly higher than the lower end of the inclined surface 168, and a gap is formed between the lower end of the inclined surface 168 and the fixed ring 158. A gap between the lower end of the inclined surface 168 and the fixed ring 158 serves as a flow path for allowing the liquid component to flow to the sealing surface SS side. A liquid reservoir 178 for storing the liquid component may be formed radially inside the protrusion 176 of the rotating ring 170.

When the stirring device 100 is driven, the liquid component in the stirring chamber SR flows through the flow path to the liquid reservoir 178. A radially outward pressure acts on the liquid component in the liquid reservoir 178 due to the centrifugal force and the pressure of the stirring object in the stirring chamber SR. Accordingly, the liquid component in the liquid reservoir 178 enters between the protrusion 176 and the fixed ring 158 and reduces the frictional force of the sealing surface SS. The liquid component discharged radially outward from the sealing surface SS is discharged to the drainage portion 154 through the drainage path 156.

According to the stirring device 100, a large amount of liquid component can be made to flow the vicinity of the sealing surface SS (the vicinity of the inside in the radial direction of the sealing surface SS). When the stirring device 100 is driven, a centrifugal force acting radially outward acts on the stirring object in the vicinity of the rotating ring 170. By using the centrifugal force, it is easier for the liquid component to flow toward the sealing surface SS, for example, as compared to a case where a sealing surface extending in the up-down direction is adopted. Accordingly, even if the rotating ring 170 rotates at a high speed, a sufficient amount of liquid component can be supplied to the sealing surface SS, and the lubricity of the sealing surface can be ensured. By allowing the liquid component to enter between the fixed ring 158 and the protrusion 176 to form the sealing surface SS, the abrasion of the fixed ring 158 and the protrusion 176 can be suppressed and the product life can be extended. By disposing the sealing surface SS above the lowermost portion of the stirring chamber SR and further bringing the sealing surface SS and the lowermost portion closer to each other even in the radial direction to cause sufficient hydraulic pressure to act on the sealing surface SS. In this case, by providing the inclined surface 168, a passage for allowing the liquid component to flow therethrough can be formed on the sealing surface SS, and the hydraulic pressure of the sealing surface SS can be further increased. Additionally, by adopting a structure in which the liquid component easily reaches the sealing surface SS, a new liquid component can be sequentially supplied to the sealing surface SS. Accordingly, the temperature rise of the sealing surface SS can be suppressed.

Additionally, in the stirring device 100, the sealing surface SS extends in the horizontal direction, and a radially inner end thereof is adjacent to the lowermost portion of the stirring chamber SR. Due to such a disposition, a radially outward centrifugal force acts on the liquid component, and the liquid component easily enters between the top surface of the protrusion 176 and the bottom surface of the fixed ring 158 from the stirring chamber SR. As the amount of liquid component entering the sealing surface SS increases, the frictional resistance between the fixed ring 158 and the rotating ring 170 decreases. Therefore, the amount of abrasion of the sealing surface SS can be reduced, and the life of the mechanical seal can be extended.

Figure 5:
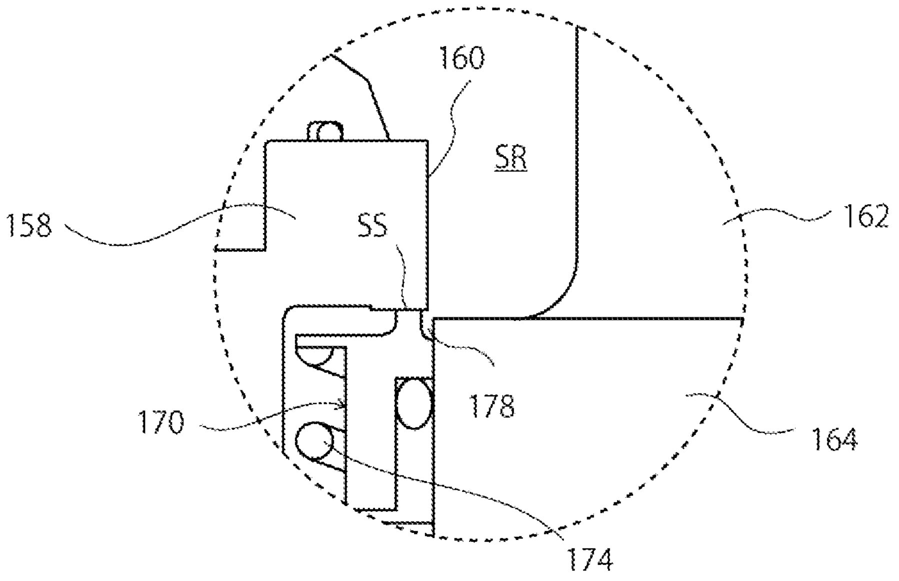
FIG. 5 is an enlarged cross-sectional view of a lower portion of a stirring tank according to a modification example.

FIG. 5 is an enlarged cross-sectional view of a lower portion of a stirring tank according to a modification example and illustrates a modification example of the stirring device. In the example illustrated in FIG. 5, the transition portion 166 is not provided between the first portion 162 and the second portion 164. In a case where the transition portion 166 is not provided, the lowermost portion of the stirring chamber SR is the lowermost portion of the first portion 162 or the uppermost portion of the second portion 164. Even in this case, the sealing surface SS is formed at the same height as the lowermost portion of the stirring chamber SR or above the lowermost portion.

Figure 6:
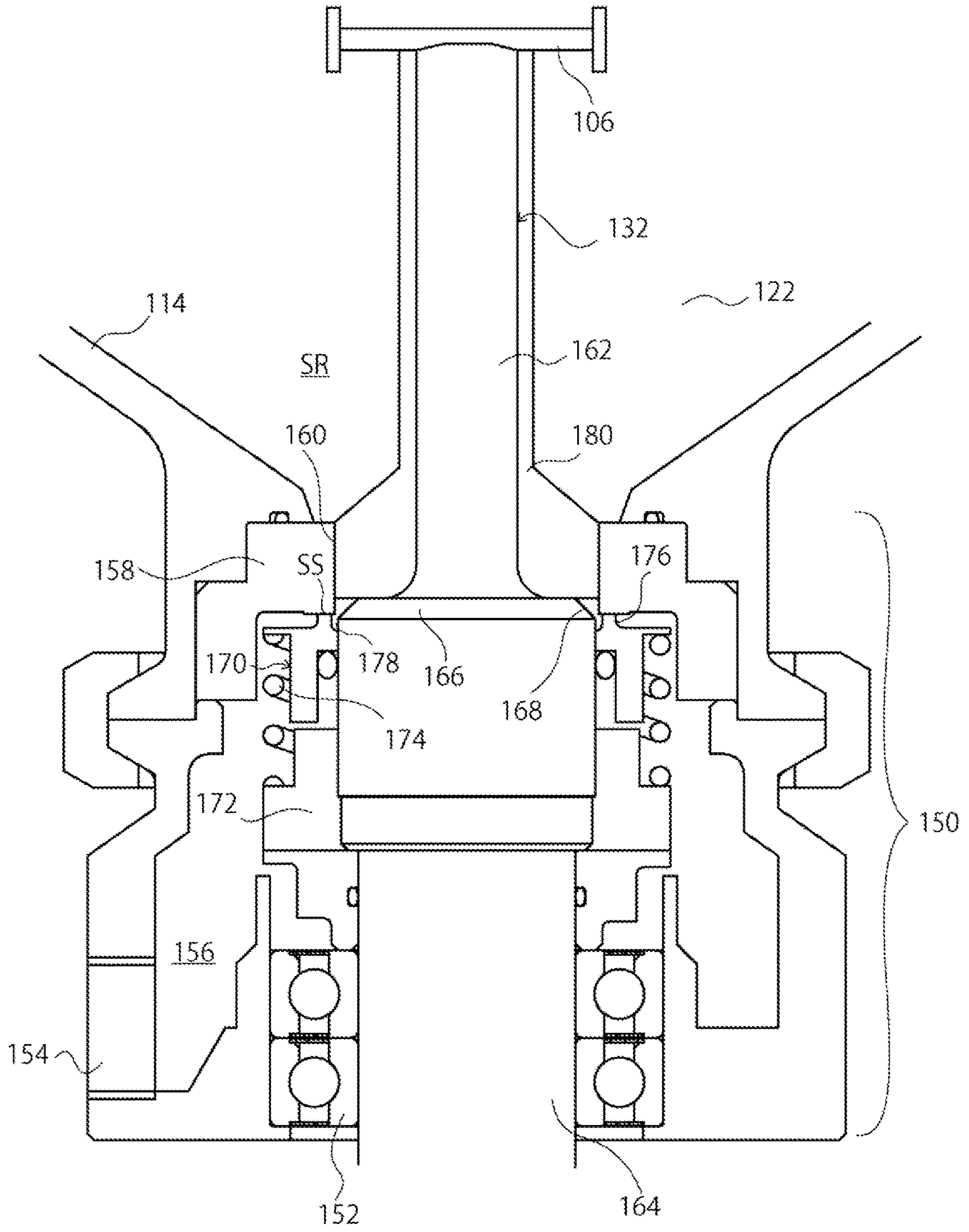
FIG. 6 is an enlarged cross-sectional view of the lower portion of the stirring tank.

FIG. 6 is a vertical cross-sectional view of a stirring device according to a modification example. As illustrated in FIG. 6, a spacer 180 may be provided to fill the space between the inner peripheral surface 160 of the fixed ring 158 and the outer peripheral surface of the shear blade drive shaft 132. The spacer 180 is detachably configured with respect to the shear blade drive shaft 132. The spacer 180 has a height approximately equal to the height between an upper portion of the transition portion 166 and the shear blade 106. A through-hole having an inner diameter approximately equal to the outer diameter of the shear blade drive shaft 132 is formed inside the spacer 180. When the spacer 180 is attached to the shear blade drive shaft 132, a lower portion of the spacer 180 fills most of the space between the outer periphery of the shear blade drive shaft 132 and the inner peripheral surface 160 of the fixed ring 158. The outer diameter of the spacer 180 is slightly smaller than the inner diameter of the inner peripheral surface 160 of the fixed ring 158. The spacer 180 rotates together with the shear blade drive shaft 132 without contacting the inner peripheral surface 160. In a case where the spacer 180 is attached, the shear blade 106 is removed from the shear blade drive shaft 132, and the spacer 180 is attached to the shear blade drive shaft 132 so as to surround the shear blade drive shaft 132 by the spacer 180. After that, the shear blade 106 is attached to the shear blade drive shaft 132. Accordingly, the spacer 180 can be fixed to the shear blade drive shaft 132. In this example, the shear blade 106 functions as a fixation portion for fixing the spacer 180 to the shear blade drive shaft 132. The fixation portion may have any structure as long as the spacer 180 can be constrained in the circumferential direction and the axial direction.

By providing the spacer 180, it is possible to suppress that the liquid component approaches the sealing surface SS. For example, the spacer 180 can be used in a case where it is desired to suppress the non-uniformity of stirring due to the stay of the stirring object between the inner peripheral surfaces 160 of the fixed ring 158. In this way, one device can process stirring objects with different requirements.

Figure 7:
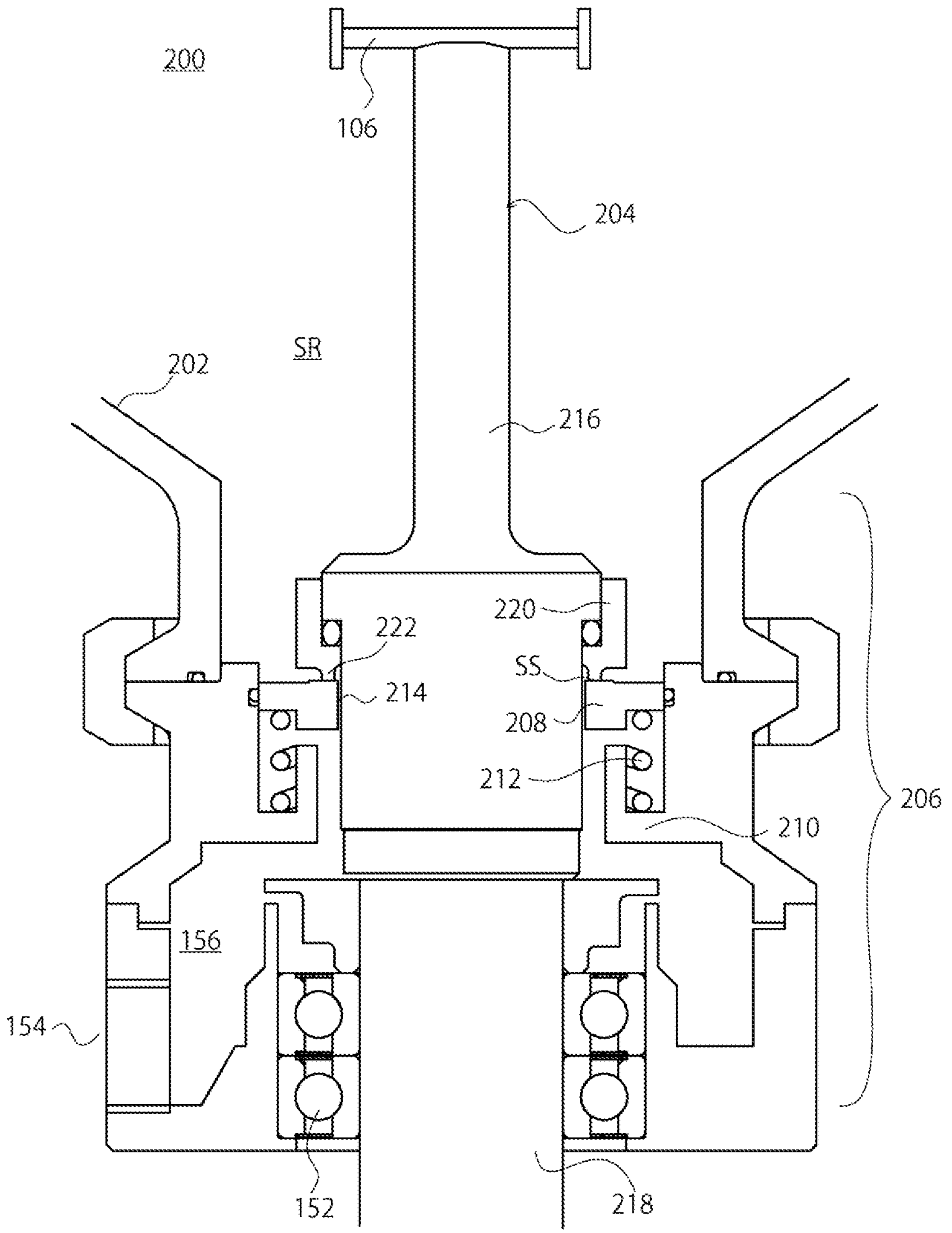
FIG. 7 is an enlarged cross-sectional view of a lower portion of a stirring device according to another embodiment.

FIG. 7 is a vertical cross-sectional view of a stirring device according to another embodiment. The stirring device 200 has portions having the same configurations as the stirring device 100, and the detailed description of the portions having the same configurations will be omitted.

The lower body portion 202 of the stirring tank of the stirring device 200 is provided with a drive shaft support portion 206 that supports a shear blade drive shaft 204 from the outside in the radial direction. The drive shaft support portion 206 is connected to a lower portion of the lower body portion 202. The shear blade drive shaft 204 penetrates the drive shaft support portion 206 and extends from a lower side of the stirring tank to the inside of the stirring chamber SR. The drive shaft support portion 206 includes a plurality of ball bearings 152 that rotatably support the shear blade drive shaft 204 from the outside in the radial direction. The drainage portion 154 and the drainage path 156 are formed in the drive shaft support portion 206.

The stirring tank includes a fixed ring 208 provided in the vicinity of the lowermost portion of the stirring chamber SR. The fixed ring 208 is fixed to an inner surface of the drive shaft support portion 206 without a gap. The fixed ring 208 is constrained in the circumferential direction and movable in the axial direction with respect to the drive shaft support portion 206. A pedestal 210 of the drive shaft support portion 206 is provided below the fixed ring 208. The fixed ring 208 is urged upward by a spring 212 disposed between the fixed ring 208 and the pedestal 210. An inner peripheral surface 214 of the fixed ring 208 is disposed at a predetermined distance from an outer peripheral surface of the shear blade drive shaft 204. By separating the two from each other, the drainage in the mechanical seal structure to be described below can be made to flow to the drainage path 156.

The shear blade drive shaft 204 includes a first portion 216 to which the shear blades 106 is fixed, and a second portion 218 that has a larger diameter than the first portion 216 and is provided below the first portion 216. The first portion 216 extends from an upper end of the shear blade drive shaft 204 to an upper end of a rotating ring to be described below, and a second portion 218 extends downward from the rotating ring.

A rotating ring 220 is attached to the vicinity of an upper end of the second portion 218. The rotating ring 220 is fixed to an outer periphery of the shear blade drive shaft 204 and rotates integrally with the shear blade drive shaft 204. The flow path resistance of a gap between an outer peripheral surface of the rotating ring 220 and an inner peripheral surface of the lower body portion 202 is sufficiently small and does not function as a non-contact seal. For example, the gap between the outer peripheral surface of the rotating ring 220 and the inner peripheral surface of the lower body portion 202 may be at least 5 mm or more apart. An annular protrusion 222 is formed at a lower portion of the rotating ring 220. The protrusion 222 extends downward from a lower surface of the rotating ring 220, and a bottom surface of the protrusion 222 faces a top surface of the fixed ring 208. When the stirring device 200 is driven, a sealing surface SS is formed between the bottom surface of the protrusion 222 and the top surface of the fixed ring 208. Therefore, in the stirring device 200, the fixed ring 208 and the rotating ring 220 form the mechanical seal structure.

The sealing surface SS is formed by the liquid component of the stirring object entering between the bottom surface of the protrusion 222 and the top surface of the fixed ring 158 when the stirring device 200 is driven. The sealing surface SS extends in the horizontal direction and a radially outer end thereof is adjacent to the lowermost portion of the stirring chamber SR. Therefore, a flow rate adjusting unit such as a labyrinth is not provided between the sealing surface SS and the stirring chamber SR. The sealing surface SS is formed at the same height as the lowermost portion of the stirring chamber SR. The lowermost portion of the stirring chamber SR in the stirring device 200 means the top surface of the fixed ring 208. The portion of the top surface of the fixed ring 208 that contacts the protrusion 222 may be upwardly bulged, and the position of the sealing surface SS may be above the position of the lowermost portion of the stirring chamber SR.

When the stirring device 200 is driven, the liquid component in the stirring chamber SR flows to an upper surface of the fixed ring 208. A radially inward pressure acts on the liquid component due to the pressure of the stirring object in the stirring chamber SR. Accordingly, the liquid component enters between the protrusion 222 and the fixed ring 208 and reduces the frictional force of the sealing surface SS. The liquid component discharged radially inward from the sealing surface SS passes between the fixed ring 208 and the shear blade drive shaft 204 and is discharged to the drainage portion 154.

According to the stirring device 200, the mechanical seal structure can be used to seal between the shear blade drive shaft 204 and the stirring tank. Accordingly, even if the shear blade drive shaft 204 is rotated at a high speed, the abrasion can be suppressed and the product life can be extended while ensuring the sealing performance. Sufficient hydraulic pressure can be made to act on the sealing surface SS by making the lowermost portion of the stirring chamber SR and the sealing surface SS at the same height and bringing the two closer to each other in the radial direction and the up-down direction.

The present invention is not limited to the above-described embodiments, and the respective components of the embodiments can be appropriately changed without departing from the spirit of the present invention.

In the above-described embodiments, a form in which the circulating impeller 104 pushes the stirring object downward and guides the stirring object to the shear blade 106 has been described, but the present invention is not limited to this. The stirring object may be pushed upward in the vicinity of the wall of the stirring tank 102 by the circulating impeller 104, the stirring object may be made to flow from the outside in the radial direction toward the center, and a downward flow directed to the shear blade 106 may be caused at a central portion of the stirring tank 102.

Additionally, the sealing surface SS may be slightly inclined with respect to the horizontal plane. In this case, an end portion of the sealing surface SS on the stirring chamber SR side may be at the same height as or above the lowermost portion of the stirring chamber SR.

It should be understood that the present invention is not limited to the above-described embodiment, but may be modified into various forms on the basis of the spirit of the present invention. Additionally, the modifications are included in the scope of the present invention.

What is claimed is:

1. A stirring device comprising:

a stirring tank that defines a stirring chamber;

a circulating impeller that is disposed in the stirring chamber;

a drive shaft that extends from a lower side of the stirring tank to an inside of the stirring chamber and rotationally drives a shear blade;

a mechanical seal structure that is disposed radially outside the drive shaft and creates a seal between the stirring tank and the drive shaft, a drainage path for guiding a liquid discharged radially outward from the mechanical seal structure to a drainage portion; and a spacer;

wherein the drive shaft includes:

a first portion to which the shear blade is fixed, and a second portion that has a larger diameter than the first portion and is provided below the first portion, wherein the mechanical seal structure includes:

a fixed ring provided in the vicinity of the lowermost portion of the stirring chamber, which includes an inner peripheral surface forming a radial gap between an outer peripheral surface of the first portion of the drive shaft, a rotating ring attached to the second portion of the drive shaft and disposed below the fixed ring, which includes a top surface facing a bottom surface of the fixed ring, and a spring that urges the rotating ring upward against the bottom surface of the fixed ring to form a sealing surface between the top surface of the rotating ring and the bottom surface of the fixed ring;

wherein the spacer is disposed between the inner peripheral surface of the fixed ring and the first portion, and is attachable to and detachable from the drive shaft; and wherein the spacer widens at its base to substantially fill the space between the inner peripheral surface and the first portion.

2. The stirring device according to claim 1, wherein the radial gap is at least 5 mm or more.

3. The stirring device according to claim 1, further comprising a drive shaft support portion that rotatably supports the drive shaft below the rotating ring, wherein the drainage path is formed in the drive shaft support portion.

4. The stirring device according to claim 1, wherein the drive shaft includes a transition portion of which a diameter increases from the first portion toward the second portion, and wherein the sealing surface is located in a range in which the transition portion is provided or below the transition portion in an up-down direction.

5. The stirring device according to claim 1, wherein a gap between the fixed ring and the rotating ring for forming the sealing surface is connected to the stirring chamber such that a liquid in the stirring chamber flows radially inward.

6. The stirring device according to claim 1, wherein the sealing surface extends in the horizontal direction.

7. The stirring device according to claim 1, wherein the rotating ring includes a protrusion that faces the bottom surface of the fixed ring, and a liquid reservoir for storing a liquid component is formed radially inside the protrusion.

8. The stirring device according to claim 1, wherein an outer diameter of the spacer is smaller than an inner diameter of the fixed ring so that the spacer does not touch the inner peripheral surface.

9. The stirring device according to claim 1, wherein the spacer is fixed to the drive shaft by the shear blade.

10. The stirring device according to claim 1, wherein the circulating impeller and the shear blade rotate independently of each other.

11. The stirring device according to claim 10, wherein the circulating impeller is a ribbon blade that generates an axial flow, provided along an inner peripheral wall of the stirring tank.

* * * * *